United States Patent [19]
Scott et al.

[11] Patent Number: 5,495,708
[45] Date of Patent: Mar. 5, 1996

[54] CANOPY HARVESTER WITH FORCE BALANCED DRIVE

[75] Inventors: Phillip R. Scott, Madera; Franklin P. Orlando, Morgan Hill; Richard K. Warren, Sanger; Larry L. Slates, Madera, all of Calif.

[73] Assignee: FMC Corporation, Chicago, Ill.

[21] Appl. No.: 298,917

[22] Filed: Aug. 31, 1994

[51] Int. Cl.⁶ .............................. A01D 46/26; A01D 46/28
[52] U.S. Cl. .............................. 56/329; 56/330; 56/DIG. 2
[58] Field of Search .................................. 56/328.1, 329, 56/330, 331, DIG. 2; 460/114

[56] References Cited

U.S. PATENT DOCUMENTS

| | | | |
|---|---|---|---|
| 3,727,388 | 4/1973 | Smith | 56/330 |
| 4,321,786 | 3/1982 | Burton | 56/330 |
| 4,418,521 | 12/1983 | Orlando et al. | 56/330 |
| 4,445,316 | 5/1984 | Browning et al. | 56/330 |
| 4,793,128 | 12/1988 | Creed | 56/330 |
| 5,067,314 | 11/1991 | Burke | 56/330 |
| 5,181,373 | 1/1993 | Littau | 56/330 X |
| 5,341,630 | 8/1994 | Littau | 56/330 |

*Primary Examiner*—George A. Suchfield
*Attorney, Agent, or Firm*—Michael B. K. Lee; Douglas W. Rudy

[57] ABSTRACT

A harvester for harvesting grapes or other fruits from plants. The harvester uses a force balanced shaker head, which rotationally oscillates around a vertical axis. A yoke extends down from the force balanced shaker. The arms of the yoke are attached to a plurality of rods, which shake the plant to harvest the fruit. Two rows of enclosures are provided below the shaker head to catch the fruit. A low profile conveyor transports the collected fruit to storage.

29 Claims, 13 Drawing Sheets

FIG_2

FIG_6

FIG_7

FIG_8

FIG_10

FIG_9

FIG_11

FIG_13

FIG_15

FIG_16

CANOPY HARVESTER WITH FORCE BALANCED DRIVE

BACKGROUND OF THE INVENTION

The present invention relates to mobile harvesters such as grape and raisin harvesters. In the past, striker bars were used on harvesters, where the striker bars had inefficient drive systems. In addition, the striker bars could come together as they struck the plant.

SUMMARY OF THE INVENTION

The inventive harvester uses shaker rods driven by a force balanced shaker. Such shaker rods do not come together, but alternately swivel about a vertical rotation point. In addition, the invention, provides an improved fruit collection system in the form of improved collection plates and conveyors.

DESCRIPTION OF THE PREFERRED EMBODIMENT

Having reference to the harvester 30 (FIGS. 1 to 4) of the present invention illustrating an upper platform 32 on a main frame 33 which supports a conventional engine 34 with the usual controls for operating the engine. The engine and controls are supported on the upper platform 32 and are accessible by a ladder 36 connected to the upper platform 32 and having steps 40 (FIG. 1).

Figure 1:
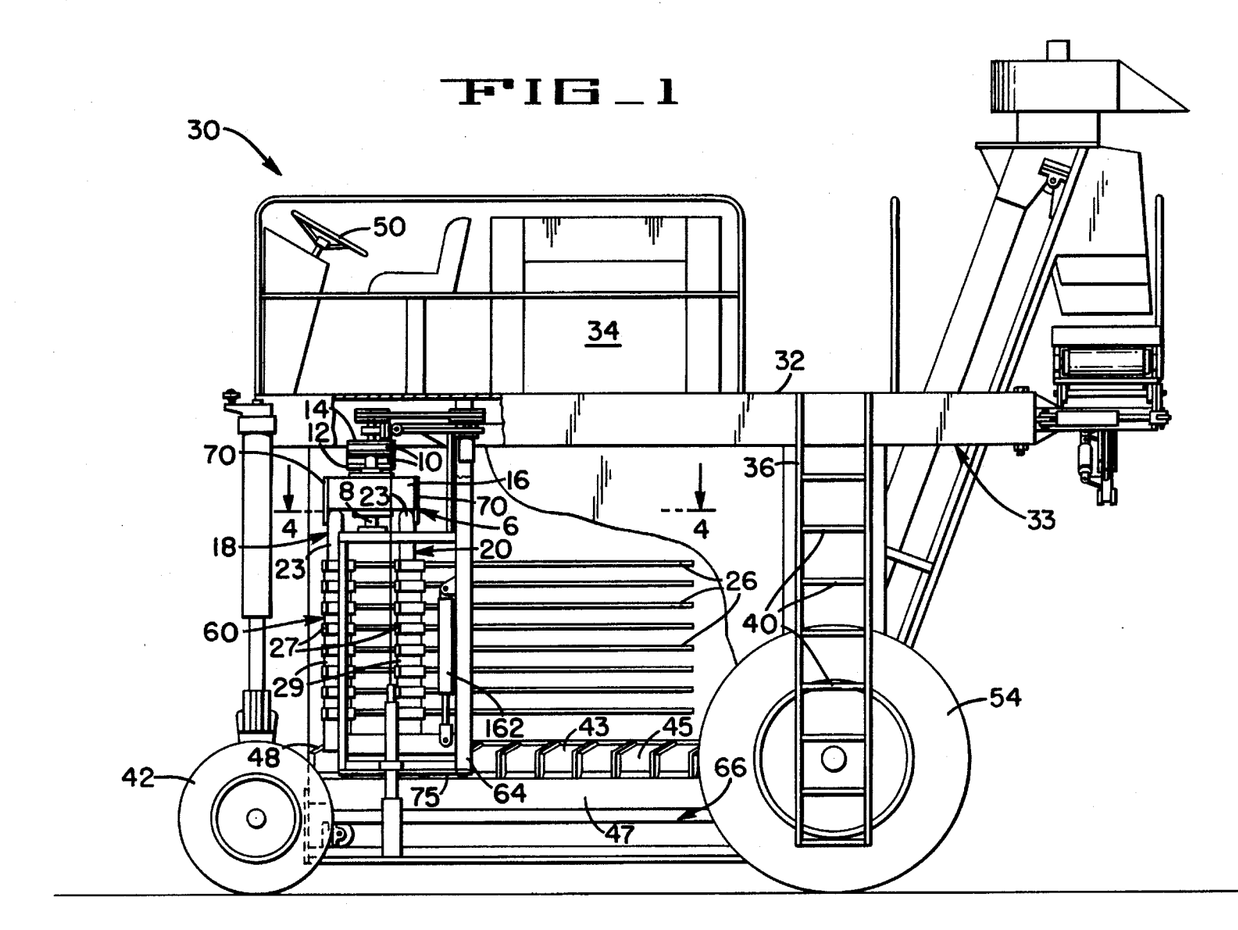
FIG. 1 is a side view of the inventive harvester.

The upper platform 32 is partially supported by the main frame 33 and a pair of small steerable front wheels 42, only one being shown in FIG. 1. The front wheels 42 are connected to a steering wheel 50 of the harvester 30 through a conventional linkage.

Figure 3:
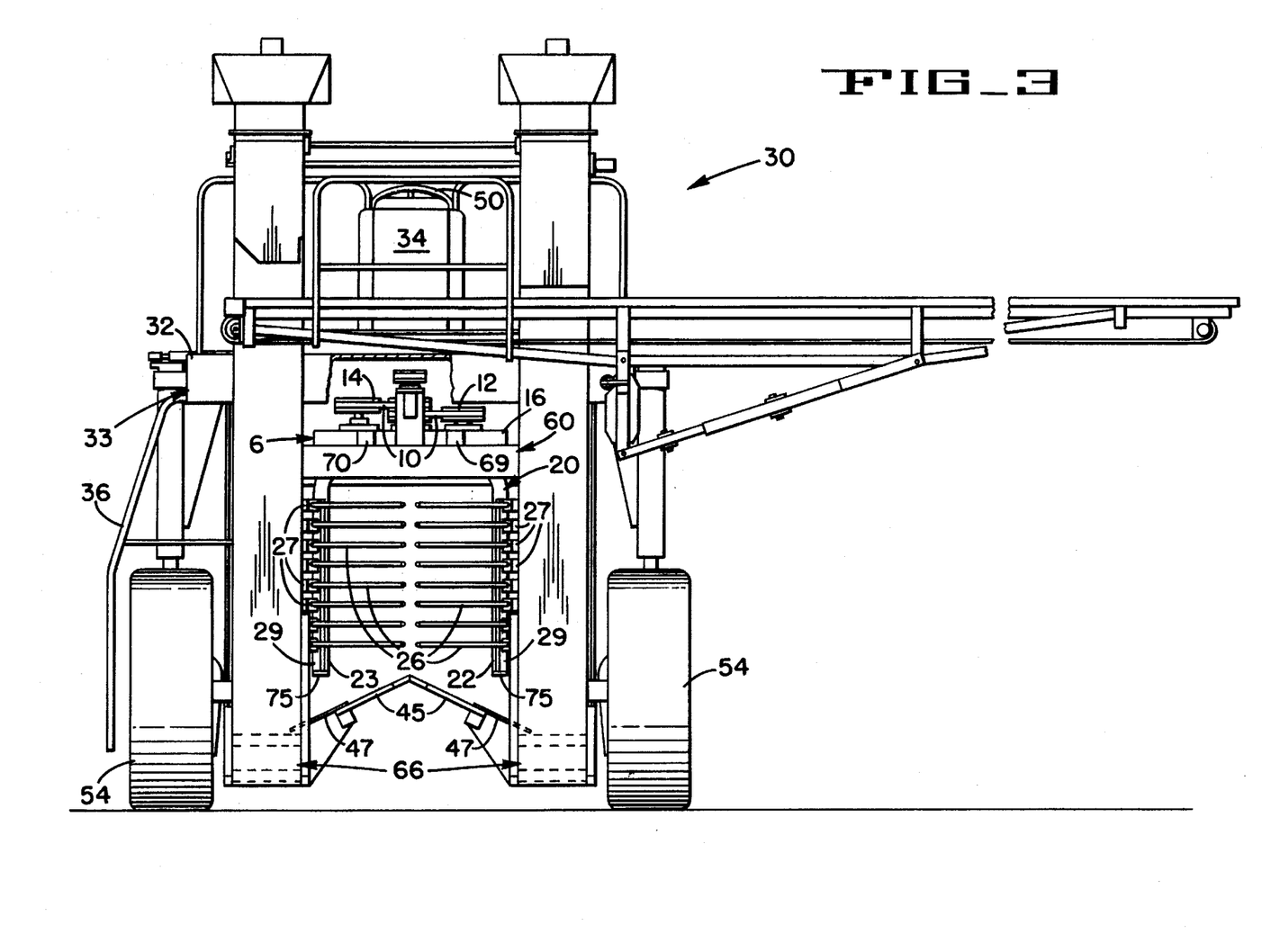
FIG. 3 is a rear view of the harvester shown in FIG. 1.

As illustrated in FIGS. 1 and 3, a pair of drive wheels 54 are connected to the engine 34 by conventional drive systems.

Figure 2:
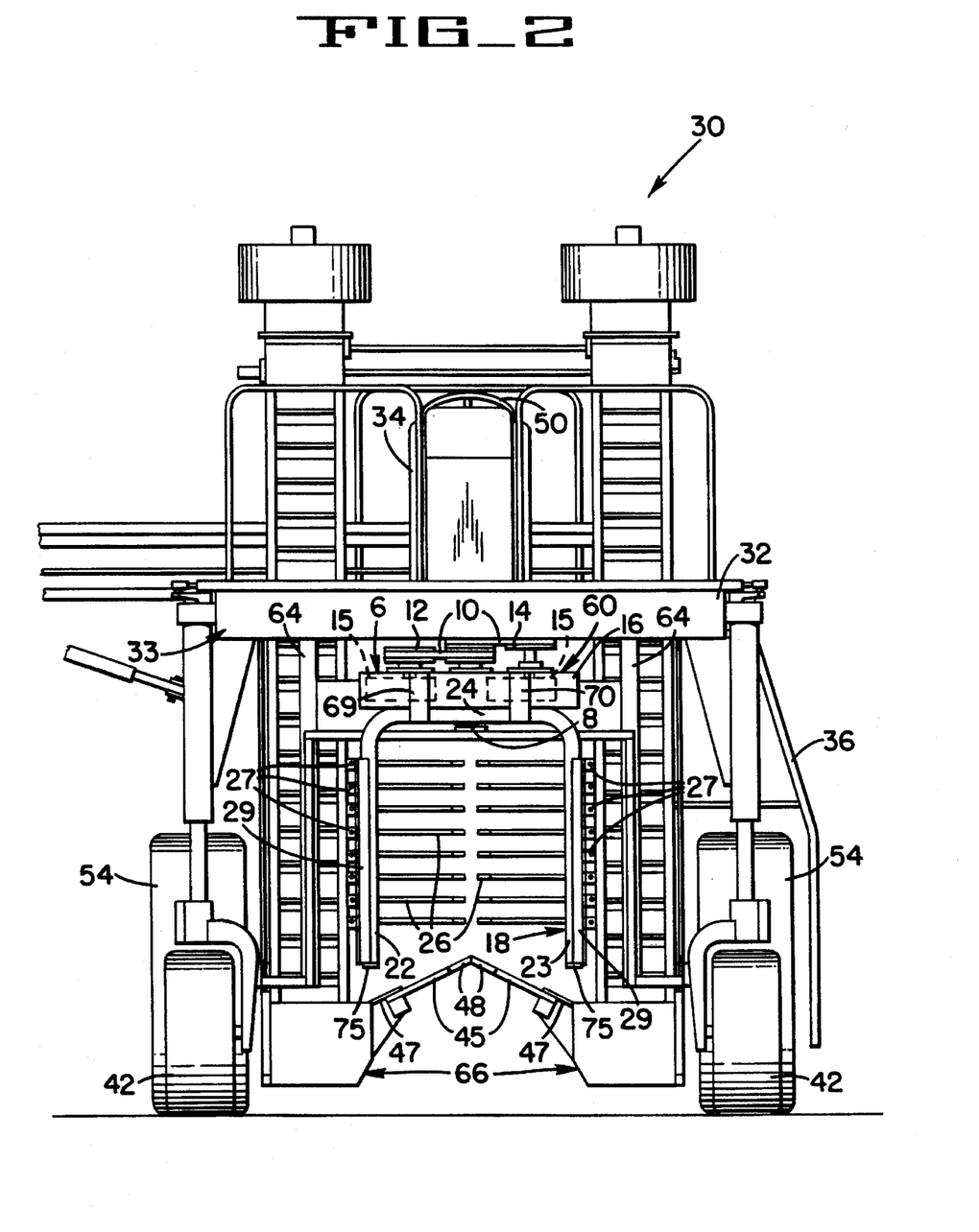
FIG. 2 is a front view of the harvester shown in FIG. 1.

As best shown in FIGS. 1 and 2, a shaker head 60 is mounted on the main frame 33 of the harvester 30. The harvester 30 includes a conveyor system 66.

Figures 4, 5:
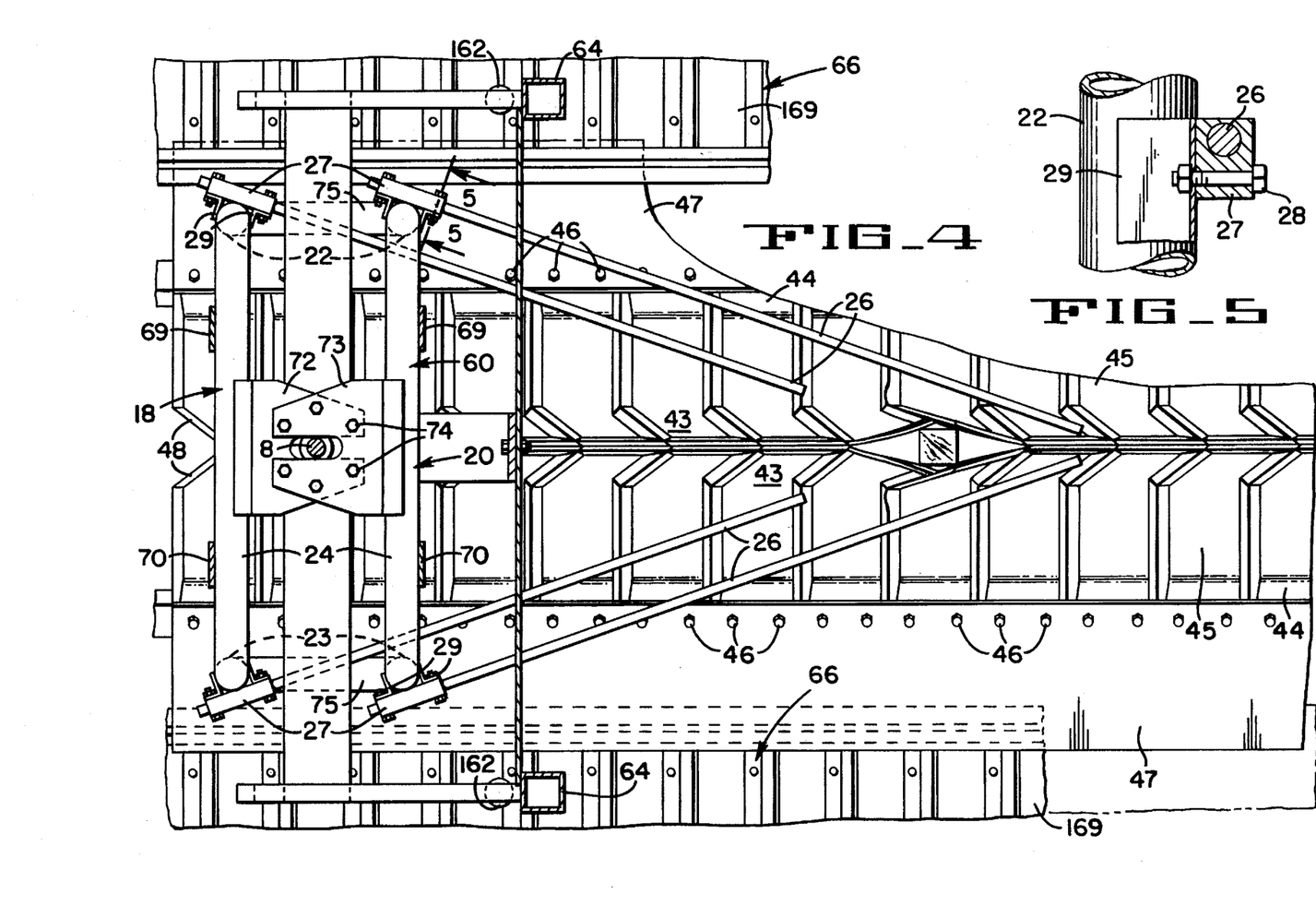
FIG. 4 is a sectional view of the harvester shown in FIG. 1 along lines 4—4.
FIG. 5 is a section taken along lines 5—5 of FIG. 4 illustrating a means for mechanically connecting a rod to the shaker head.

FIG. 4 is a cross sectional view of a shaker head as illustrated in FIG. 1 along lines 4—4. In the preferred embodiment, the shaker head 60 comprises a force balanced shaker 6. The force balanced shaker 6 is a conventional force balanced shaker 6, such as the one described in U.S. Pat. No. 4,335,570 incorporated by reference, and comprises a central drive shaft 8, with drive belts 10 which drive a first weight pulley 12 and a second weight pulley 14. The first weight pulley 12 and the second weight pulley 14 drive eccentric weights 15 shielded by the force balanced shaker housing 16. The force balanced shaker 6 is mechanically connected to a first U-shape yoke 18 and a second U-shape yoke 20. The first and second U-shape yokes 18, 20 each comprise a first leg 22, a second leg 23, and a cross piece 24 connecting the first leg 22 to the second leg 23. Welded to the cross piece 24 of each yoke 18, 20 is a first vertical flange 69 and a second vertical flange 70 which are bolted to the force balanced shaker 6. A first horizontal collar 72 is welded to the first U-shape yoke 18. A second horizontal collar 73 is welded to the second U-shape yoke 20. The first horizontal collar 72 and second horizontal collars are bolted to the force balanced shaker 6 by bolts 74. A pair of bottom flanges 75 join the bottom of the second leg 23 of the first U-shape yoke 18 with the bottom of the second leg 23 of the second U-shape yoke, and the bottom of the first leg 22 of the first U-shape yoke 18 with the bottom of the first leg 22 of the second U-shape yoke 20.

A plurality of rods 26 are mechanically connected to each of the first and second legs 22, 23, as shown in FIG. 1. In a preferred embodiment, seven rods 26 are mechanically connected to the first and second legs 22, 23. FIG. 5 is a cross sectional view of a mechanical connection between a rod 26 and a leg illustrated in FIG. 4 at lines 5—5. One end of the rod 26 is pressed or screwed into a mounting block 27. Bolts 28 connect the mounting block 27 to a pair of angle irons 29 which are connected to the first leg 22, by welding. The rods 26 are angled so that on the first end connected to the first or second legs 22, 23 are further from a center axis of the harvester than the second ends of the rods not connected to the first or second legs 22, 23. The center axis of the harvester is the axis along center of the harvester that extends along the direction of travel of the harvester.

Since the central drive shaft 8 and the first and second weight pulleys 12, 14 all rotate around a vertical axis, the force balanced shaker 60 provides a shaking motion around a vertical axis, which is near the center of the force balanced shaker 60. In the preferred embodiment, the force balanced shaker 60 rotates around a vertical axis passing through the central drive shaft 8.

Figure 6:
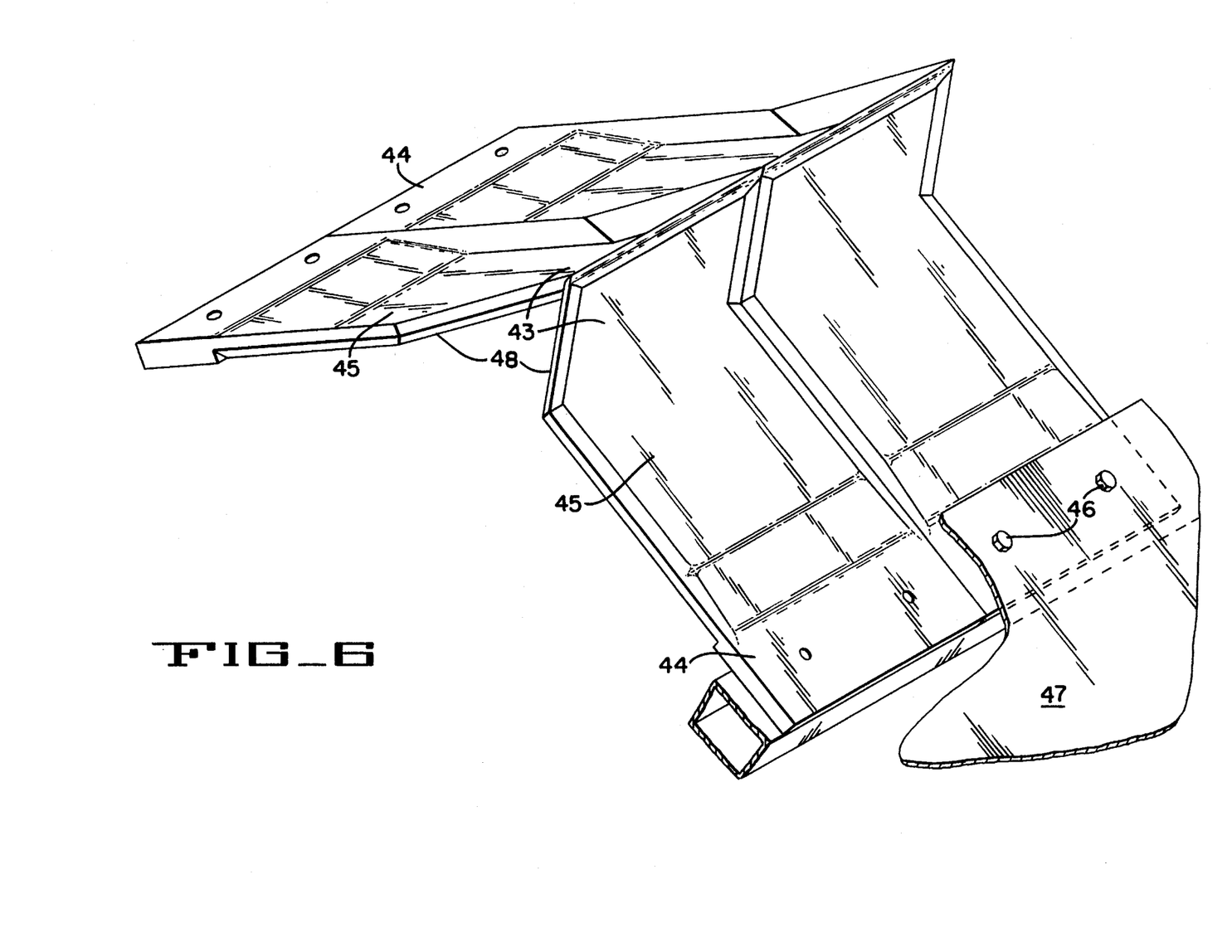
FIG. 6 is a view of enclosures used in the embodiment shown in FIG. 1.

In the preferred embodiment illustrated in FIG. 1 below the rods 26 are two rows of a plurality of flexible closures 45 made of an elastomer. The location between the two rows of closures 45 is defined as the center of the harvester 30. The closures 45 are flat and angled at approximately 30° as shown in FIG. 2. A first end 43 of the flexible closures 45 lie along the center of the harvester 30. A second end 44 of the flexible closures 45 are mechanically connected by bolts 46 to catching plates 47. As shown in FIG. 6, the second end 44 of the flexible closures 45 are rectangular, and the first end. 43 of the flexible closures 45 are diamond shaped. The diamond shape provides a leading edge 48 that is angled so that the leading edge 48 extends towards the rear of the harvester 30 as the edge approaches the center of the harvester 30. A first side of a catching plate 47 is connected to the flexible closures 45, a second side of the catching plate 47 ends above a conveyor 66. In the preferred embodiment, the catching plates are vibrated by a vibrator.

A shaker head frame 64 is connected between the main frame 33 and shaker head 60 and supports the shaker head 60. A hydraulic cylinder 162 connected between the main frame 33 and the shaker head frame 64 is used to raise and lower the shaker head frame 64 to raise and lower the shaker head 60.

In operation, an operator steers the harvester using steering wheel 50 to control the front wheels 42, so that grape or other plants to be harvested are placed between the flexible closures 45. As the plant enters between the two rows of flexible closures 45 the flexible closures 45 flex allowing the plant to pass between the two rows of flexible closures 45. The angle of the leading edge 48 allows the plant to more easily separate the flexible closures 45. The shaker head 60 cause the first and second U-shape yokes 18, 20 to oscillate around the center drive shaft 8. The oscillation of the first and second U-shape yokes 18, 20 cause the second ends of the rods to oscillate. When the plant is in the area of the second ends of the rods 26, the rods 26 shake the plant causing fruit, such as grapes or berries, to dislodge from the plant and fall to the flexible closures 45 and catching plates 47 below. As the plant passes through the shaker head 60 the plant gets further from the central drive shaft 8 upon which the center of rotation of the shaker head 60 lies. Given an angle of oscillation around the center of rotation of the shaker head 60, as the radius increases from the center of rotation the arc length of oscillation also increase. Therefore as the plant gets further from the center of rotation, the displacement of the plant also increases. The angle of the flexible closures 45 and the catching plates 47 and the vibration caused by the vibrator cause the fruit to slide to the conveyors 66, which transport the fruit to a storage means.

Figure 7:
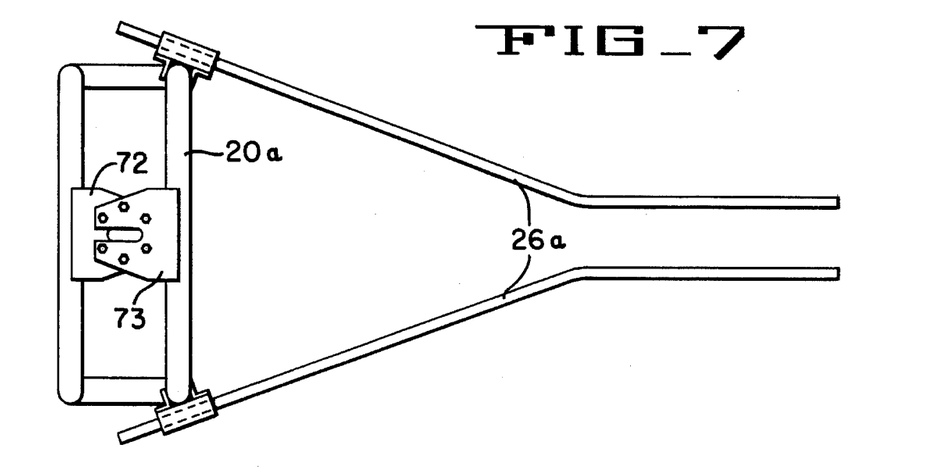
FIG. 7 is a view of shaker rods used in another embodiment of the invention.

FIG. 7 illustrates another preferred embodiment of the invention. In FIG. 7, the rods 26a have a single bend, providing portions of the rods 26a that are parallel to each other and the direction of movement of the harvester 30. In addition, the rods 26a are attached only to the second yoke 20a. Because of this, in another embodiment, the double yoke may be replaced by a single yoke.

Figures 8, 10:
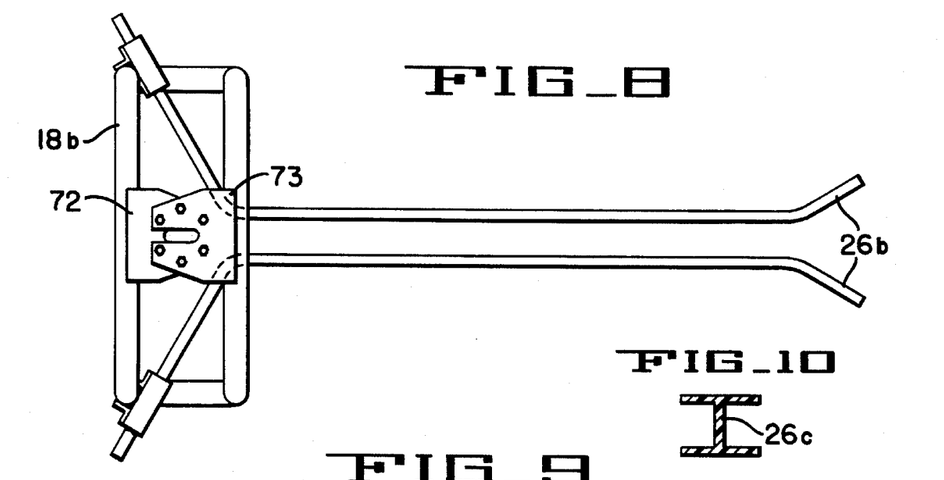
FIG. 8 is a view of shaker rods used in another embodiment of the invention.
FIG. 10 is a cross sectional view of the shaker rods as shown by lines 10—10 of FIG. 9.

FIG. 8 illustrates another preferred embodiment of the invention. In FIG. 8, the rods 26b have two bends. A first part of the rods 26b are connected to only the first U-shape yoke 18b. The second pans of the rods 26b are parallel to each other. The third parts of the rods 26b, angle away from the center of the harvester 30.

Figure 9:
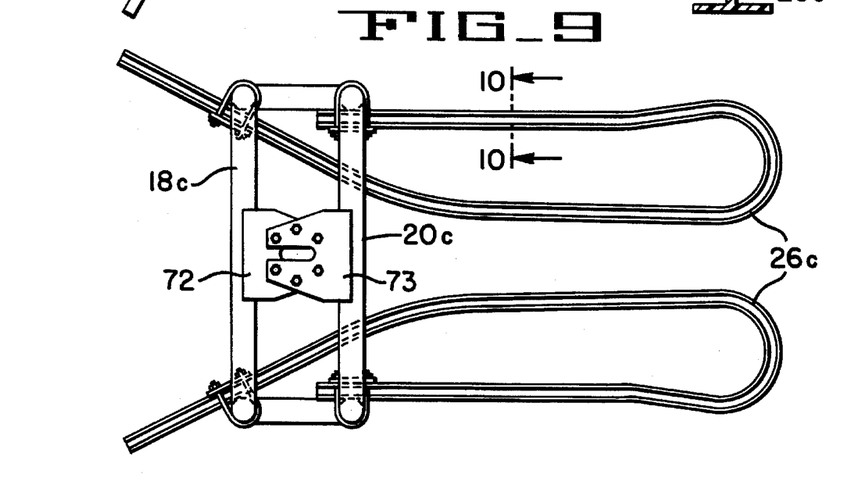
FIG. 9 is a view of shaker rods used in another embodiment of the invention.

FIG. 9 illustrates another preferred embodiment of the invention. The rods 26c are curved and have a first end mechanically connected to the first U-shape yoke 18c and a second end mechanically connected to the second U-shape yoke 20c. FIG. 10 is a cross sectional view of the rods 26c in FIG. 9 along line 10—10. The cross section of the rods 26c are an I shape, with a flat part of the I facing the center of the harvester 30. The rods 26c make a bend greater than 180°. This embodiment allows for more flexible rods.

Having reference to another preferred embodiment of the invention in a harvester 130 (FIGS. 11 to 14) of the present invention illustrating a main frame 133 which supports a conventional engine 134 with the usual controls for operating the engine. The engine and controls are supported on the main frame 133.

Figure 11:
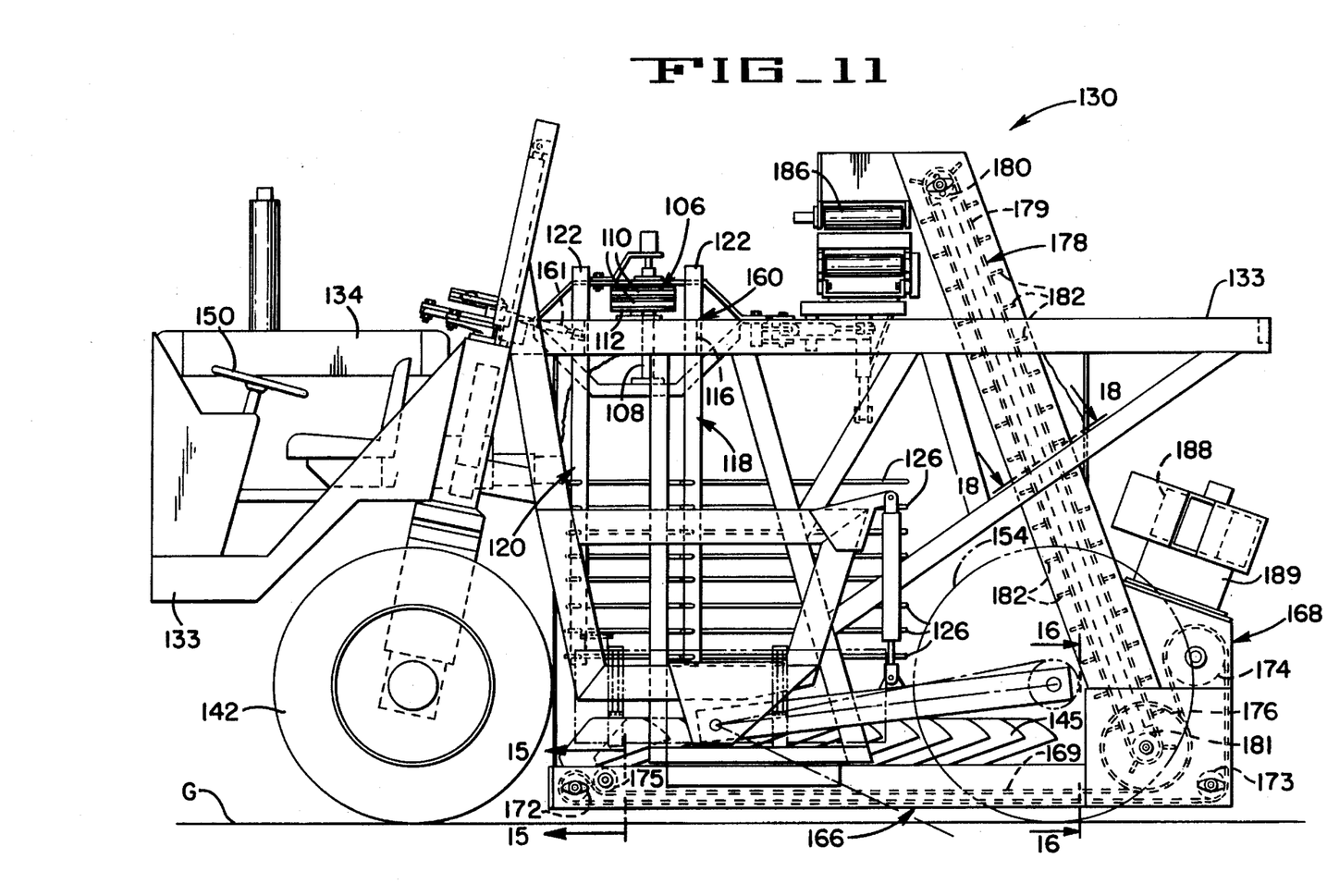
FIG. 11 is a side view of another embodiment of the inventive harvester.

The main frame 133 is partially supported by a pair of steerable front wheels 142, on the ground G. The front wheels 142 are connected to a steering wheel 150 of the harvester 130 through a conventional linkage.

Figure 12:
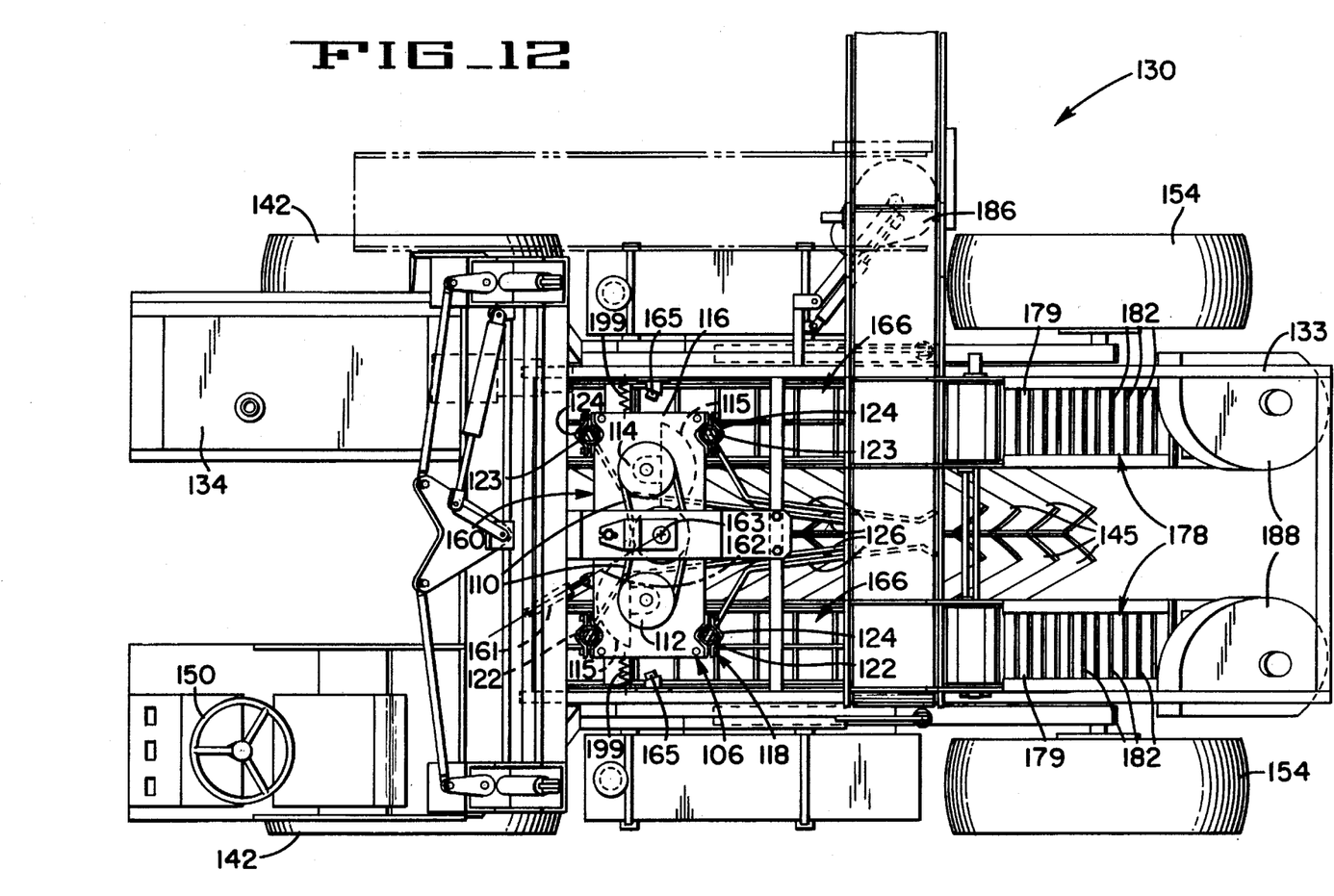
FIG. 12 is a top view of the harvester shown in FIG. 11.
Figure 13:
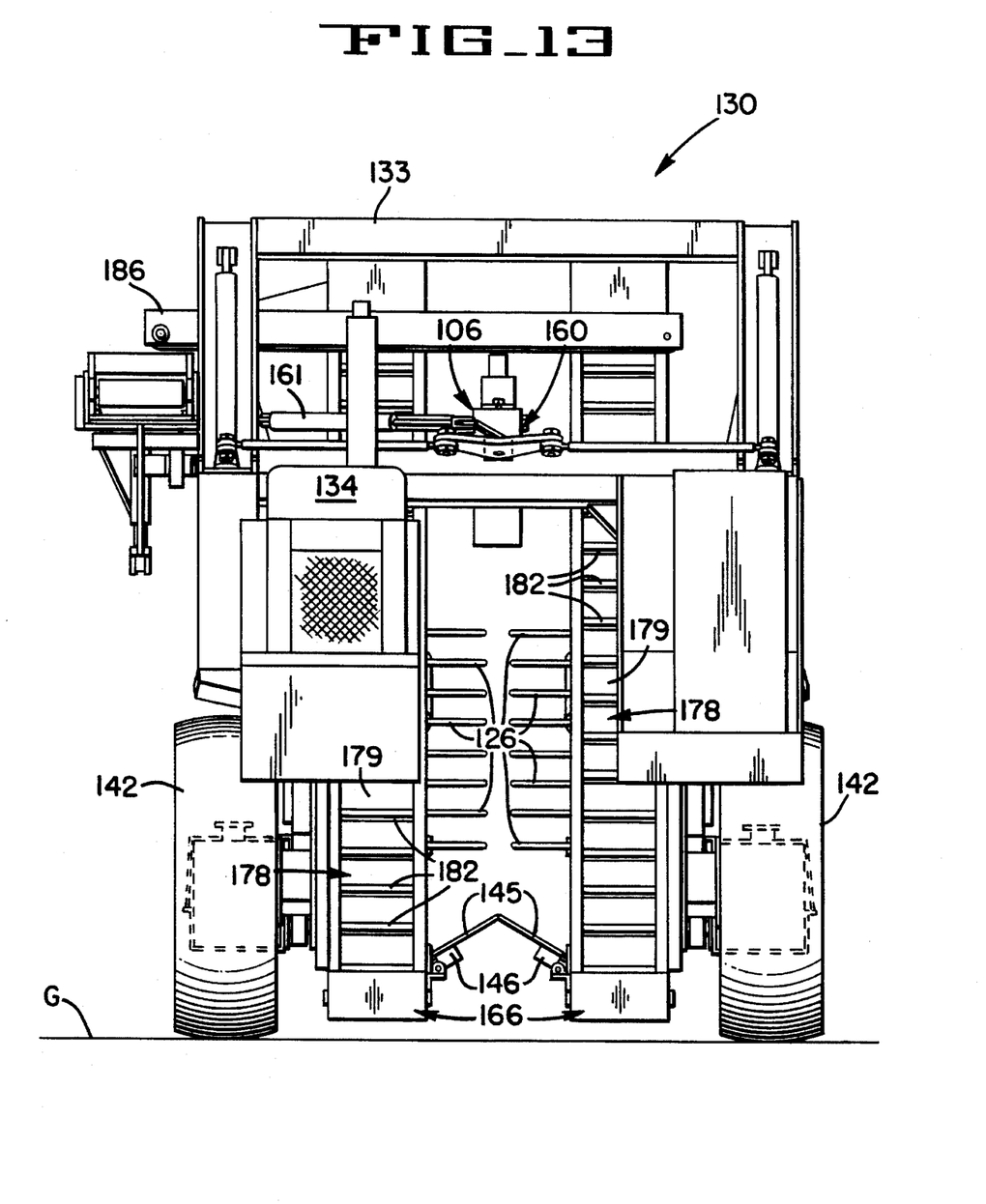
FIG. 13 is a front view of the harvester shown in FIG. 11.

As illustrated in FIGS. 11 and 12, the harvester is also supported by a pair of rear wheels 154. In this embodiment the front wheels 142 and rear wheels 154 are connected to the engine 134 by conventional drive systems.

As best shown in FIGS. 11 and 12, a shaker head 160 is mounted on the main frame 133 of the harvester 130. The harvester 130 includes a conveyor system 166.

In the preferred embodiment, the shaker head 160 comprises a force balanced shaker 106. The force balanced shaker 106 is a conventional force balanced shaker 106, such as the one described in U.S. Pat. No. 4,335,570 incorporated by reference, and comprises a central drive shaft 108, with drive belts 110 which drive a first weight pulley 112 and a second weight pulley 114. The first weight pulley 112 and the second weight pulley 114 drive eccentric weights 115 shielded by the force balanced shaker housing 116. The force balanced shaker housing 116 forms part of a first yoke 118 and a second yoke 120. The first and second yokes 118, 120 each comprise a first leg 122, a second leg 123, and a cross piece formed by the force balanced shaker housing 116 connecting the first leg 122 to the second leg 123. The first legs 122 and the second legs 123 are mechanically connected to the shaker housing 116 by clamps 124. The clamps 124 allow for easy adjustment of the first legs 122 and second legs 123 allowing for the raising and lowering and rotation of the first and second legs 122, 123.

A plurality of rods 126 are mechanically connected to each of the first and second legs 122, 123, wherein the rods 126 are horizontal. The angle of the plurality of rods 126 may be changed by loosening the clamps 124 and rotating the first and second legs 122, 123.

Since the central drive shaft 108 and the first and second weight pulleys 112, 114 all rotate around a vertical axis, the force balanced shaker 160 provides a shaking motion around a vertical axis 163, which is near the center of the force balanced shaker 160. In the preferred embodiment, the force balanced shaker 160 rotates around a vertical axis 163 passing through the central drive shaft 108.

A damper 161 is connected between the shaker head 160 and the main frame 133. When the shaker head 160 is centered the force balanced shaker 106 is centered and a line 162 passing through the length of the damper 161 also passes through the axis of rotation 163 of the shaker head 160. Because of this relationship, when the shaker head 160 is centered, the moment arm of the damper with respect to the axis of rotation 163 of the shaker head 160 is zero. As the shaker head 160 rotates from its centered position, the moment arm between the damper 161 and the axis of rotation 163 of the shaker head increases. Therefore, for distances close to center minimum damping occurs, which eliminates unwanted damping and heat generation. The damper 161 is set so that the first 1 inch of extension of the damper 161 provides no damping, and then after the first 1 inch of extension, damping is provided in proportion to velocity. This also minimizes damping when the shaker head is near center. When the shaker head 160 is moved far from center, the damper 161 then provides damping. Side bumpers 165 are also placed on the main frame, to prevent damage if the shaker head 160 hits the main frame 133. Springs 199 are also connected between the shaker head 160 and the main frame 133 to center the shaker head 160. If the harvester 130 is driven off center the plants will not be at the center of the harvester 130. Because the springs 199 are flexible, they allow the shaker head 160 to be off center, allowing the shaker head to harvest fruits from plants that are not at the center of the harvester 130.

Figure 14:
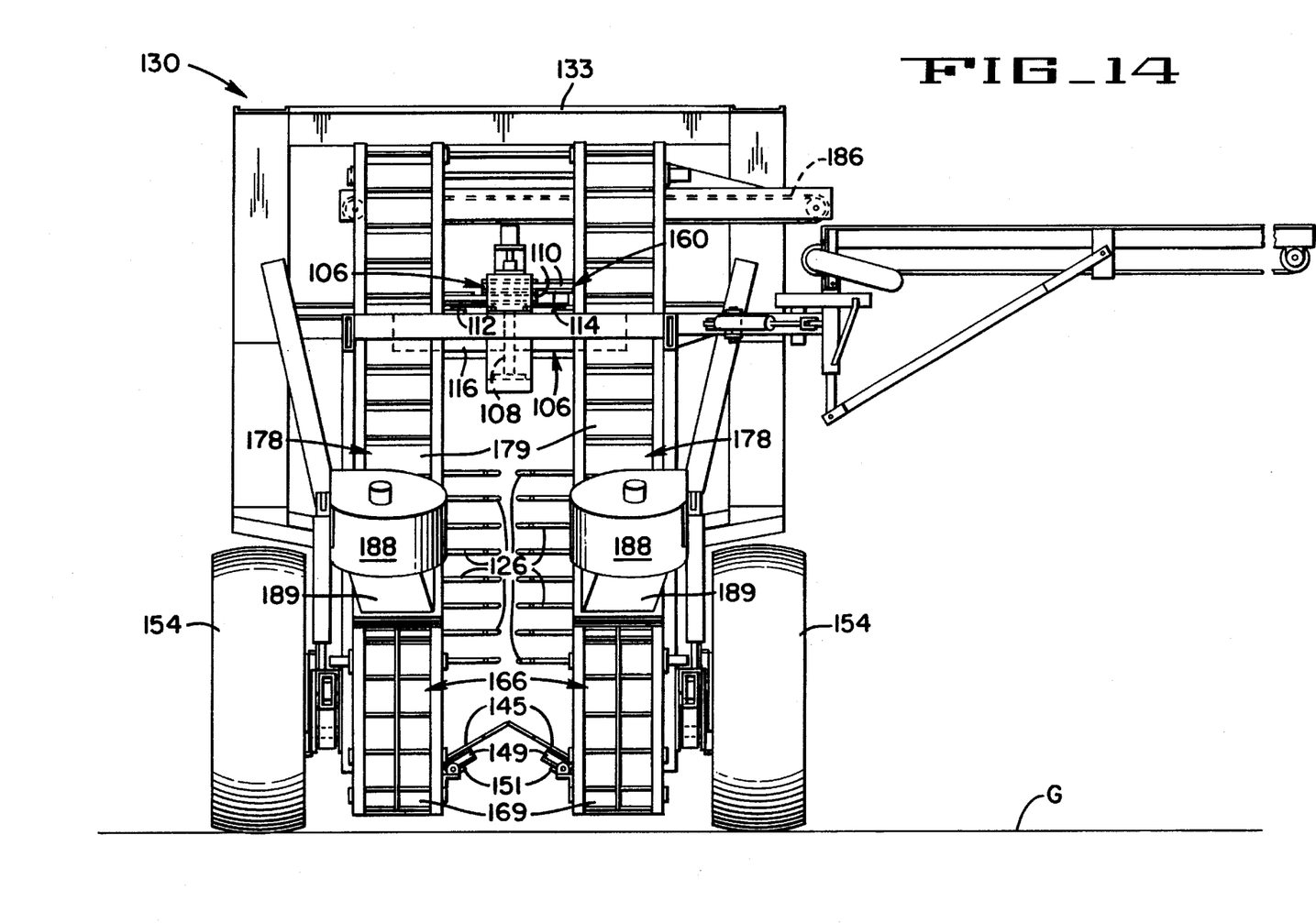
FIG. 14 is a rear view of the harvester shown in FIG. 11.
Figure 15:
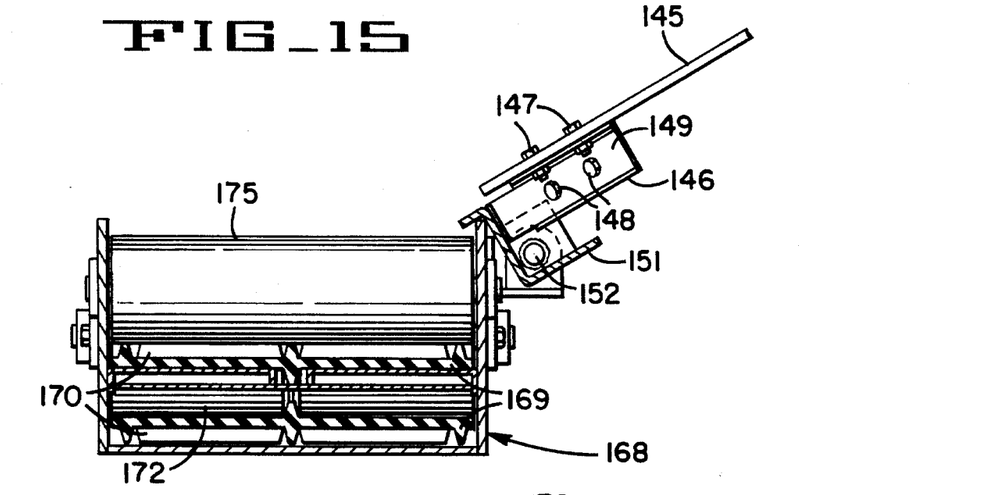
FIG. 15 is a section taken along lines 15—15 of FIG. 11 illustrating the fruit collection system.
Figure 17:
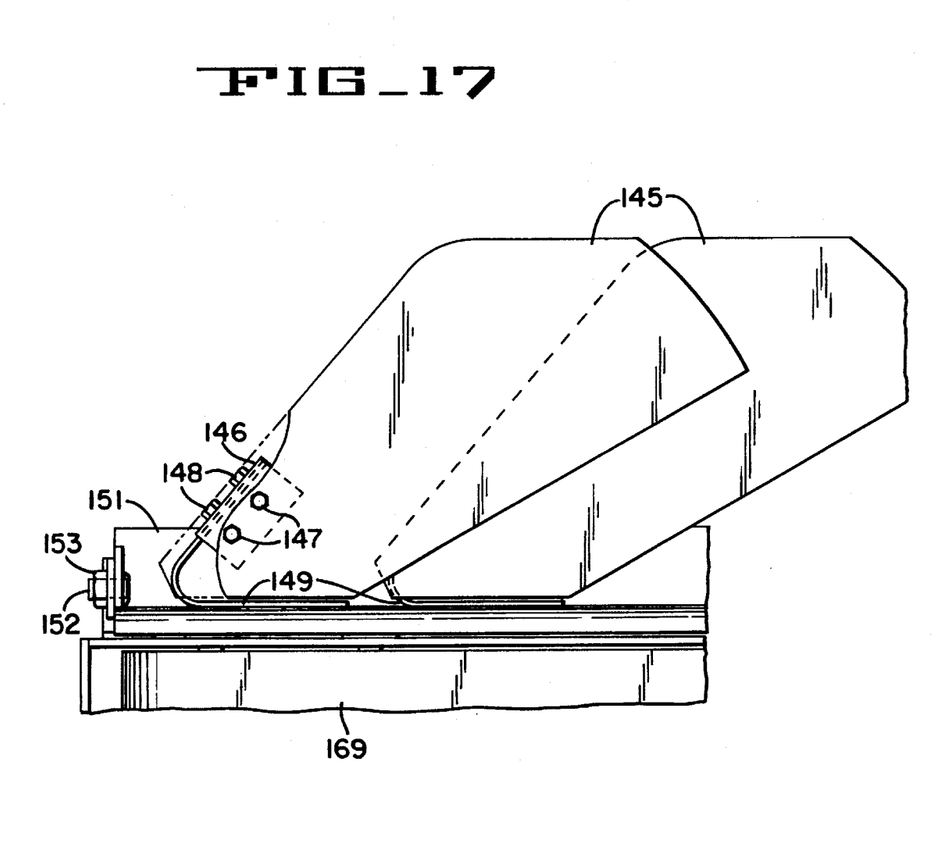
FIG. 17 illustrates a catch plate and associated mechanism used in the harvester shown in FIG. 11.

Below the rods 160 are two rows of a spring loaded closure plates 145. The location between the two rows of closure plates 145 is defined as the center of the harvester 130. FIGS. 14, 15, and 17 provide a more detailed view of the closures 145 and supporting apparatus. Each closure 145 is mounted on an L-shaped bracket 146. Two bolts 147 mechanically connect the closure plates to a first leg of the L-shaped brackets 146. A second set of bolts 148 mechanically connect a second leg of the L-shaped brackets to a first leg of an angle spring 149. The angle spring 149 is a flat plate of spring metal bent into an acute angle, as shown. The second leg of the angle springs 149 are bolted to a rail 151, with the bolts providing a mechanical connection between the angle springs 149 and the rail 151. The rails 151 run along the length of the harvester 130 and are connected at each end by rail bolts 152 and rail nuts 153. When the rail bolts 152 are loosened in the rail nuts 153 the rails 151 are allowed to rotate around an axis parallel to the length of the rails 151 which is along the length of the harvester 130. The legs of the rails 151 limit the angle of rotation to less than 45°. The rail bolts 152 and rail nuts 153 are then tightened holding the rails 151 at the desired rotation. This allows the setting of the closure plates 145 at various desired angles.

Figure 16:
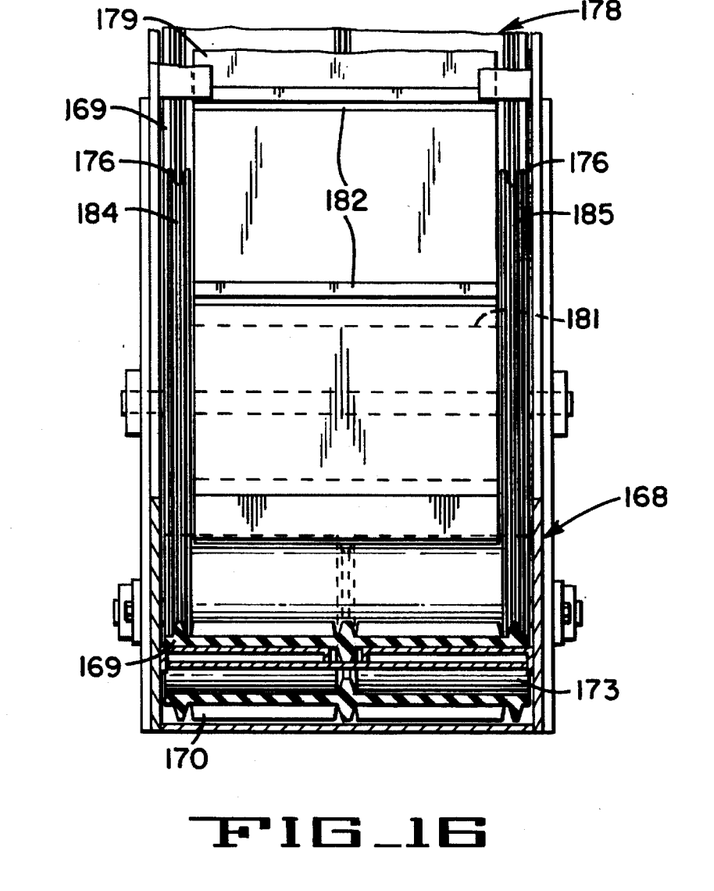
FIG. 16 is a section taken along lines 16—16 of FIG. 11 illustrating the conveyor system.
Figure 18:
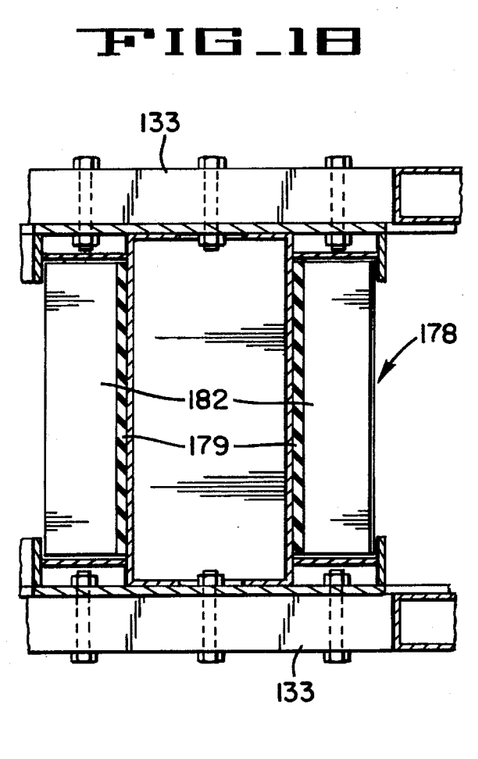
FIG. 18 is a section taken along lines 18—18 of FIG. 11 illustrating the conveyor system.

FIGS. 15, 16 and 18 are detailed views of the conveyor system shown in FIG. 11. In this embodiment a first conveyor 168, comprises a first belt 169, with flights 170 less that 1 inch high, providing a low profile belt. The first conveyor 168, further comprises a front inner roller 172, a rear inner roller 173, an upper inner roller 174, a front outer roller 175 and a rear outer roller 176. The first belt 169 extends from below the front inner roller 172 to the front of the front inner roller 172 and then to the top of the front inner roller, and in front of the front outer roller 175, and then under the front outer roller to under the rear outer roller 176, and then to the rear of the rear outer roller 176, and then in front of the upper inner roller 174, and then to the top of the upper inner roller 174, and then to the rear of the upper inner roller 174, and then to the rear of the rear inner roller 173, and then under the rear inner roller 173, and then under the front inner roller 172, thus forming a continuous loop. The front inner roller 172 and rear inner roller 173 are placed so that the portion of the first belt 169 extending from under the rear inner roller 173 to under the front inner roller 172 is substantially parallel to the ground G. The front outer roller 175 and rear outer roller 176 are placed so that the portion of the first belt 169 extending from under the front outer roller 175 to under the rear outer roller 176 is substantially parallel to the ground G, horizontally The front inner roller 172, the rear inner roller 173, the front outer roller 175, and the rear outer roller 176 lie along a common plane. The upper inner roller 174 lies above the rear outer roller 176, and is placed so that the front of the upper inner roller 174 is in front of the rear of the rear outer roller 176, so that the part of the first belt 169 traveling from the rear of the rear outer roller 176 to the front of the upper inner roller 174 travels in an upward and forward direction. The sides of the first belt 169 are V-belts. The rear outer roller comprises a first pulley 184 and a second pulley 185 which mate with the V-belts of the first belt 169. The first belt 169 wraps around the rear outer roller 176 more than 90° but less than 180°. The upper inner roller 174 is used to drive the first belt 169.

A second conveyor 178 comprises a second belt 179, a top roller 180 and a bottom roller 181. The second belt 179 has flights 182 which are greater than 2 inches high providing a high profile belt. The second belt 179 extends from under the bottom roller 181 to the front of the bottom roller 181 to the front of the top roller 180 over the top of the top roller 180 to the back of the top roller 180 to the back of the bottom roller 181 and then to the bottom of the bottom roller 181 forming a continuous loop. The top roller 180 is placed in front of and above the bottom roller 181, as shown so that the second belt 179 extending from the bottom roller 181 to the top roller 180 makes an angle between 60° and 85° as shown. A cross conveyor 186 is near the top of the second conveyor 178. The top roller 180 is used to drive the second belt 179.

The rear outer roller 176 and the bottom roller 181 are co-axial and are rotated with a common axis.

Fans 188 are placed above the rear outer roller 176 and the upper inner roller. Housings 189 go from the intake part of the fans 188, surrounding the rear outer roller 176, the upper inner roller 174, the rear inner roller 173, and the bottom roller 181.

In operation, an operator steers the harvester using steering wheel 150 to control the front wheels 142, so that grape or other plants to be harvested are placed between the rows of closure plates 145. As the plant enters between the two rows of closure plates 145 the closure plates 145 flex the angle springs 149 allowing the plant to pass between the two rows of closure plates 145. The shaker head 160 cause the first and second yokes 118, 120 to oscillate around the center drive shaft 108. The oscillation of the first and second yokes 118, 120 cause the rods 126 to oscillate. After the plant passes the first and second yokes 118, 120, the plant is subjected to a as shaking motion by the rods 126, where the displacement of the shaking motion increases as the plant gets further from the center of oscillation 163 causing fruit, such as grapes or berries, to dislodge from the plant and fall to the closure plates 145. The angle of the closure plates 145 cause the fruit to slide to the first conveyor 168. The first conveyor 168 moves the fruit towards the rear of the harvester. Because the fruit is being transported horizontally, the low flights 170 are sufficient for moving the fruit. Fruit is then transported around the bend at the rear outer roller 176. Centrifugal force causes the fruit to be moved by the low flights in an upward direction, while traveling around the rear outer roller 176. The upward and forward movement of the first belt 169 causes the fruit to fall into the second conveyor 178. The second belt 179 has higher flights 182, which allows the second conveyor 178 to transport the fruit in a direction with a vertical component. The fruit is lifted over the top of the second conveyor 178 to the cross conveyor 186.

Since conveyor system 166 provides a first conveyor 168 that uses a first belt 169 with low flights, less than 1 inch, the first conveyor 168, is able to be kept low to the ground G. The first belt 169 wraps around the rear outer roller 176 by more than 90° the first belt is able to transfer fruit to the second belt 179, which conveys the fruit in an upward and forward direction. By conveying the fruit in a forward direction, the horizontal length of the conveyor system 166 is minimized, allowing for the minimization of the length of the harvester 130. In addition, since the first belt 169 conveys the fruit rearward and then folds under itself, it provides an open front conveyor, which allows for larger plants to pass to the shaker head 160. The fans 188 draw air which passes between the first belt 169 and the second belt 179. This causes air to move through the fruit as the fruit falls from the first belt 169 to the second belt 179. This arrangement, provides a more efficient removal of trash from the fruits. Since the flights 182 of the second conveyor 178 are higher than the flights 170 of the first conveyor 168, and since the belts are parallel, using the same idler shaft the flights 170, 182 act as a feeder of large material such as long vines and sticks into the fans 188 which removes the large material from the fruits.

Figure 19:
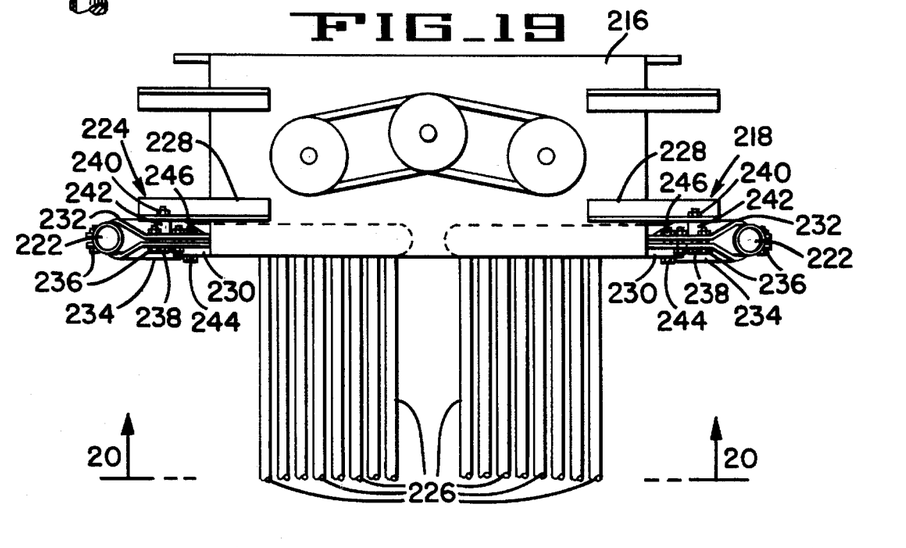
FIG. 19 is a top view of part of another embodiment of a clamping system.
Figures 20, 21:
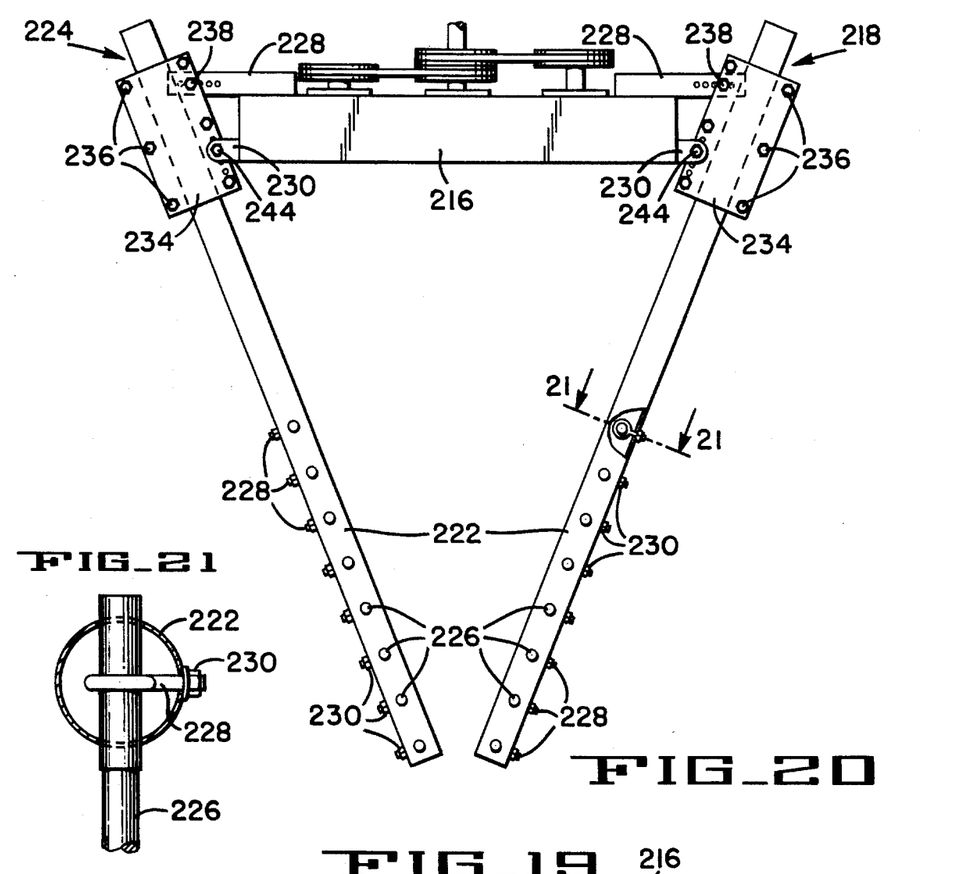
FIG. 20 is a side view of the embodiment shown in FIG. 19, along line 20—20.
FIG. 21 is a cross sectional view of a shaker rods shown in FIG. 19, along line 21—21.

FIG. 19 shows a top view of part of another embodiment of a clamping system 224. The clamping system 224 is mechanically connected to a shaker housing 216. The clamping system 224 is used to mechanically connect a first leg 222 to the shaker housing 216. The clamping system 224 comprises a top plate 228, a bottom plate 230, a first clamp half 232, a second clamp half 234, clamp half bolts 236, top plate bolt 238, top plate nut 240, top plate spacer 242, bottom plate bolt 244, and a bottom plate nut 246. The top plate 228 has a plurality of bolt holes running along the length of the top plate 228. On end of the top plate 228 is welded to the top of the shaker housing 216. The bottom plate 230 has a single bolt hole and is welded to the bottom of the shaker housing 216. The first clamp half 232 and the second clamp half 234 are held together by the clamp half bolts 236, so that the first and second clamp halves 232, 234 are clamped around the first leg 222. The first clamp half 232 and the second clamp half 234 have a plurality of holes to allow an adjustable mounting of the first and second clamp halves 232, 234 on the top plate 228 and bottom plate 230. A bottom plate bolt 244 is placed through one of the plurality of holes in the first and second clamp halves 232, 234 and then through the single hole in the bottom plate 230. A bottom plate nut 246 is placed around the bottom plate bolt 244 and tightened. A top plate bolt 238 is placed through one of the plurality of holes in the first and second clamp halves 232, 234, then through the top plate spacer 242, and then through a hole in the top plate 228. A top plate nut 240 is placed around the top plate bolt 238 and tightened. The plurality of holes in the top plate 228 and the plurality of holes in the first and second clamp halves 232, 234 allow the first leg 222 to be placed vertically, or to be angled from the vertical at various angles "a" from the vertical.

Although the embodiment shown in FIG. 19, is able to accommodate a first yoke and a second yoke, a first leg 222 for a first yoke 218 is only provided. A plurality of rods 226 are mounted to the first leg 222. A plurality of eye bolts 228 are placed within the first leg 222, so that an end of each rod 226 passes through an eyebolt 228. A nut 230 is placed at the end of each eyebolt 228 on the outside of the first leg 222. The nut is tightened, tightening the grip on the rod 226 by the eyebolt 228 and the first leg 222. This eye bolt type of clamping provides claiming with a low weight clamping system.

Although the best modes contemplated for carrying out the present invention have been herein shown and described, it will be understood that modification and variation may be made without departing from what is regarded to be the subject matter of the invention.

What is claimed is:

1. An apparatus for harvesting fruits from plants, wherein the apparatus has a forward direction, comprising:

a frame;

means for providing a rotational oscillation about a substantially vertical axis of rotation and mounted on the frame;

a first plurality of shaker rods;

a second plurality of shaker rods means for mounting the first plurality of shaker rods on a first side of a plane, defined by the forward direction and the axis of rotation, and the second plurality of shaker rods on a second side of the plane, defined by the forward direction and the axis of rotation, wherein the means for mounting is mechanically connected to the means for providing rotational oscillation; and means for moving the frame in a forward direction, wherein the means for moving positions the frame with respect to the plants so that the plants pass between the first plurality of shaker rods and the second plurality of shaker rods, mechanically connected to the frame.

2. The apparatus, as claimed in claim 1, wherein the means for providing a rotational oscillation is a force balanced shaker.

3. The apparatus, as claimed in claim 2, wherein the means for mounting comprises:

a first leg;

means for mechanically connecting the means for providing a rotational oscillation to the first leg;

means for mechanically connecting the first plurality of shaker rods to a part of the first leg which extends below the cross piece;

a second leg; and means for mechanically connecting the means for providing a rotational oscillation to the second leg;

means for mechanically connecting the second plurality of shaker rods to a part of the second leg which extends below the cross piece.

4. The apparatus, as claimed in claim 3, wherein the means for mechanically connecting the means for providing a rotational oscillation to the first leg, comprises means for rotating the first leg about an axis extending through a length of the first leg and raising and lowering the first leg, and wherein the means for mechanically connecting the means for providing a rotational oscillation to the second leg, comprises means for rotating the second leg about an axis extending through a length of the second leg and raising and lowering the second leg.

5. The apparatus, as claimed in claim 4, wherein the means for mechanically connecting the means for providing a rotational oscillation to the first leg, further comprises a means for adjusting the angle between the first leg and the means for providing a rotational oscillation and wherein the means for mechanically connecting the means for providing a rotational oscillation to the second leg, further comprises a means for adjusting the angle between the second leg and the means for providing a rotational oscillation.

6. The apparatus, as claimed in claim 3, further comprising a damper with a length mechanically connected between the frame and the force balanced shaker, wherein when the force balanced shaker is centered a line running along the length of the damper passes through the vertical axis of rotation of the force balanced shaker.

7. The apparatus, as claimed in claim 6, wherein the damper provides no damping for approximately the first 1 inch of extension and then provides damping after it is extended greater than approximately 1 inch.

8. The apparatus, as claimed in claim 6, further comprising:

a first spring mechanically connected between the frame a first side of the means for providing a rotational oscillation: and a second spring mechanically connected between the frame and a second side of the means for providing a rotational oscillation.

9. The apparatus, as claimed in claim 8, further comprising:

a first bumper mechanically connected to the frame and adjacent to the first spring; and a second bumper mechanically connected to the frame and adjacent to the second spring.

10. The apparatus, as claimed in claim 3, wherein the means for mechanically connecting the first plurality of shaker rods to a part of the first leg, comprises:

a plurality of eyebolts inside of the first leg, wherein an end of a shaker rod passes through an eye in an eyebolt, and wherein the shaker rod passes through two apertures in the first leg, and wherein threads on the eyebolt pass to outside of the first leg through an aperture in the first leg; and a plurality of nuts wherein a nut is threaded onto an eyebolt outside of the first leg.

11. The apparatus, as claimed in claim 3, further comprising:

a first row of flexible closures, wherein the flexible closures have a first end which has a rectangular shape, and a second end, which has a diamond shape;

a second row of flexible closures, wherein the flexible closure have a first end which has a rectangular shape, and a second end which has a diamond shape, and wherein the second ends of the first row of flexible closures are adjacent to the second ends of the second row of flexible closures;

a first catching plate mechanically connected to the first ends of the first row of flexible closures; and a second catching plate mechanically connected to the first ends of the second row of flexible closures.

12. The apparatus, as claimed in claim 11, wherein the flexible closures are made of an elastomer.

13. The apparatus, as claimed in claim 3, further comprising:

a first row of closure plates;

a first rail running along the length of the harvester;

a first row of angle springs forming an acute angle mechanically connected between the first row of closure plates and the first rail;

a second row of closure plates;

a second rail running along the length of the harvester; and a second row of angle springs forming an acute angle mechanically connected between the second row of closure plates and the second rail.

14. The apparatus, as claimed in claim 13, further comprising:

means for adjusting the angle of the first rail; and means for adjusting the angle of the second rail.

15. The apparatus, as claimed in claim 3, further comprising a conveying system, comprising:

an inner front roller;

an inner rear roller, behind the inner front roller and the same vertical height as the inner front roller;

an upper inner roller above the inner rear roller;

a rear outer roller in front of the rear inner roller and below the upper inner roller;

a first belt which extends from below the front inner roller and then in front of the front inner roller and then over the front inner roller, and then in front of the upper inner roller, and then over the upper inner roller, and then behind the upper inner roller, and then behind the rear inner roller, and then under the rear inner roller, and then under the front inner roller, thus forming a continuous loop;

a top roller higher than and in front of the bottom roller; and a second belt which extends from under the bottom roller to in front of the bottom roller to in front of the top roller over the top of the top roller to behind of the top roller to behind the bottom roller and then below the bottom roller forming a continuous loop.

16. The apparatus, as claimed in claim 15, further comprising a front outer roller, wherein the first belt extends from in front of the front inner roller, and then to in front of the front outer roller, and then under the front outer roller, to trader the rear outer roller.

17. The apparatus as claimed in claim 15, wherein the bottom roller, coaxial with the rear outer roller.

18. The apparatus, as claimed in claim 15, wherein the first belt has flights which are less than 1 inch high and wherein the second belt has flights which are greater than 2 inches high.

19. The apparatus, as claimed in claim 18, wherein the first belt wraps around the rear outer roller for an angle greater than 90° and less than 180°.

20. The apparatus, as claimed in claim 15, further comprising a fan located above the upper inner roller.

21. An apparatus for catching fruit falling from plants, comprising:

a first row of flexible closures, wherein the flexible closures have a first end which has a rectangular shape, and a second end, which has a diamond shape;

a second row of flexible closures, wherein the flexible closure have a first end which has a rectangular shape, and a second end, which has a diamond shape, and wherein the second ends of the first row of flexible closures are adjacent to the second ends of the second row of flexible closures;

a first catching plate mechanically connected to the first ends of the first row of flexible closures; and a second catching plate mechanically connected to the first ends of the second row of flexible closures.

22. The apparatus, as claimed in claim 21, wherein the flexible closures are made of an elastomer.

23. An apparatus for catching fruit falling from plants, comprising:

a first row of closure plates;

a first rail running along a first side of the plants;

a first row of angle springs forming an acute angle mechanically connected between the first row of closure plates and the first rail;

a second row of closure plates;

a second rail running along a second side of the plants; and a second row of angle springs forming an acute angle mechanically connected between the second row of closure plates and the second rail.

24. The apparatus, as claimed in claim 23, further comprising:

means for adjusting the angle of the first rail; and means for adjusting the angle of the second rail.

25. An apparatus for conveying objects horizontally from front to back and vertically from bottom to top, comprising:

an inner front roller:

an inner rear roller, behind the inner front roller and the same vertical height as the inner front roller;

an upper inner roller above the inner rear roller;

a front outer roller behind the front inner roller;

a rear outer roller in front of the rear inner roller and below the upper inner roller:

a first belt which extends from below the front inner roller and then in front of the front inner roller and then over the front inner roller, and then in front of the front outer roller, and then under the front outer roller to under the rear outer roller and then to the rear of the rear outer roller, and then in front of the upper inner roller, and then over the upper inner roller, and then behind the upper inner roller, and then behind the rear inner roller, and then under the rear inner roller, and then under the front inner roller, thus forming a continuous loop:

a bottom roller, coaxial with the rear outer roller;

a top roller higher than and in front of the bottom roller; and a second belt which extends from under the bottom roller to in front of the bottom roller to in front of the top roller over the top of the top roller to behind of the top roller to behind the bottom roller and then below the bottom roller forming a continuous loop.

26. The apparatus, as claimed in claimed 25, wherein the first belt has flights which are less than 1 inch high and wherein the second belt has flights which are greater than 2 inches high.

27. A method of conveying objects, comprising the steps of:

conveying the objects on a first belt in a horizontal direction in a rear direction;

turning the first belt a direction greater than 90° so that the objects are conveyed in an upward and forward direction and so that the objects are held against the belt by centrifugal force during the turn;

extending the first belt in an upward and forward direction, so that the objects fall from the first belt;

catching the objects which fall from the first belt in a second belt; and conveying the objects caught by the second belt in an upward and forward direction.

28. The method, as claimed in claim 27, further comprising the step of passing air between the first belt and the second belt to debris from the objects.

29. A method of removing fruits from plants, comprising the steps of:

moving a harvester around a row of plants so that plants pass near the center of the harvester;

providing a first plurality of horizontal shaker rods on a first side of the plants;

providing a second plurality of horizontal shaker rods on a second side of the plants;

mechanically connecting the first plurality and second plurality of horizontal shaker rods to a shaker means; and oscillating the shaker means and the first and second plurality of shaker rods about a vertical axis between the plurality of first and second shaker rods.

* * * * *